(12) United States Patent
Perrot et al.

(10) Patent No.: US 12,551,980 B2
(45) Date of Patent: Feb. 17, 2026

(54) DEGREASING AND DRY DEBURRING MACHINE WITH A SUCTION SYSTEM, AND ASSOCIATED METHOD

(71) Applicant: SPALECK INDUSTRIES, Brognard (FR)

(72) Inventors: Yvan Perrot, Port-Lesney (FR); Pascal Bigot, Sainte Marie (FR)

(73) Assignee: SPALECK INDUSTRIES, Brognard (FR)

( * ) Notice: Subject to any disclaimer, the term of this patent is extended or adjusted under 35 U.S.C. 154(b) by 543 days.

(21) Appl. No.: 17/909,951

(22) PCT Filed: Mar. 5, 2021

(86) PCT No.: PCT/FR2021/050377
§ 371 (c)(1),
(2) Date: Sep. 7, 2022

(87) PCT Pub. No.: WO2021/181034
PCT Pub. Date: Sep. 16, 2021

(65) Prior Publication Data
US 2023/0124242 A1 Apr. 20, 2023

(30) Foreign Application Priority Data
Mar. 12, 2020 (FR) ..................... 2002471

(51) Int. Cl.
*B24B 31/12* (2006.01)
*B01D 46/24* (2006.01)
*B01D 46/71* (2022.01)

(52) U.S. Cl.
CPC .......... *B24B 31/12* (2013.01); *B01D 46/2411* (2013.01); *B01D 46/71* (2022.01)

(58) Field of Classification Search
None
See application file for complete search history.

(56) References Cited

U.S. PATENT DOCUMENTS 3,948,003 A * 4/1976 Pletscher ................ B24B 31/02
451/328
4,116,161 A * 9/1978 Steube .................... C23C 14/32
118/727

(Continued)

FOREIGN PATENT DOCUMENTS

DE 9014485 U1 1/1991
DE 4220260 A1 * 1/1994 ............. B24B 55/06

(Continued)

OTHER PUBLICATIONS

Foreign Communication from a Related Counterpart Application, International Search Report and Written Opinion with Translation dated Jul. 22, 2021, International Application No. PCT/FR2021/050377 filed on Mar. 5, 2021.

*Primary Examiner* — David S Posigian
*Assistant Examiner* — Dana Lee Poon
(74) *Attorney, Agent, or Firm* — Conley Rose, P.C.

(57) ABSTRACT

A dust suction system for a dry degreasing and deburring machine includes an air suction circuit, a suction fan, a settling chamber provided with a filter cartridge, and an unclogging unit provided for injecting a flow of unclogging air into the filter cartridge during an unclogging operation. The dust suction system includes a control unit that controls the fan and the unclogging unit depending on measurements of pressure and load in the air suction circuit.

18 Claims, 4 Drawing Sheets

(56) References Cited

U.S. PATENT DOCUMENTS

| | | | | |
|---|---|---|---|---|
| 4,926,601 A | * | 5/1990 | Musschoot | ............ B01F 31/60 |
| | | | | 451/328 |
| 2018/0093215 A1 | * | 4/2018 | Pindter | ............... B01D 46/023 |

FOREIGN PATENT DOCUMENTS

| WO | 0220131 A1 | 3/2002 | | |
|---|---|---|---|---|
| WO | WO-2017203163 A1 | * | 11/2017 | ............ B24B 31/02 |
| WO | 2021181034 A1 | 9/2021 | | |

* cited by examiner

DEGREASING AND DRY DEBURRING MACHINE WITH A SUCTION SYSTEM, AND ASSOCIATED METHOD

TECHNICAL FIELD OF THE INVENTION

The present invention relates to a dry degreasing and deburring machine as well as to a dust suction system intended to equip such a machine. The present invention also relates to a dust suction method for such a machine.

TECHNICAL BACKGROUND

It is well known that the degreasing, deburring, and polishing of industrial stamped, forged, cast or machined parts and extruded and machined profiles are tedious and time-consuming. Apart from processes with manual tools or mechanical brushing devices, the most commonly used technique is tribofinishing, which consists of immersing one or more parts in a vibrating tank loaded with abrasive bodies working in a wet environment with the addition of chemicals to degrease and lubricate the moving load. The load of parts and abrasives is vibrated by an out-of-balance motor to cause the abrasives to rub against the parts for deburring or polishing. The parts are then separated from the abrasives, washed and dried to avoid any corrosion problems. This technology is hindered by polluting liquid and solid discharges that are costly to recycle or dispose of and a high noise level.

The applicant has proposed an improvement to the tribofinishing machines and method in application WO2017/203163A1. This document describes and represents a machine and a method for dry degreasing and deburring by rotating barrel for precision-machined parts and profiles, especially ones made of metal, more particularly aluminum. The machine comprises a rotating treatment tank designed to receive at least one workpiece to be treated, an absorbent medium preferably in powder form such as corn cob or wood chips, and an abrasive medium that does not require the addition of water or chemicals or lubricants. Advantageously, the abrasive medium is constituted by parts such as extruded polymer cones with a very low wear rate, preferably a polymer called SPIC and supplied by Spaleck Industries, 1070 Allee Henri Hugoniot, 25600 Brognard, France.

The tank is provided with openings to evacuate dust and debris from the treatment process out from the tank and a suction channel to evacuate dust and debris. The machine also has a dust suction system which is connected to the suction channel.

Although the previously described machine is very efficient, the present invention aims to propose improvements to make it even more efficient.

SUMMARY OF THE INVENTION

The invention provides a dust suction system for a dry degreasing and deburring machine comprising:
an air suction circuit,
a suction fan,
a settling chamber equipped with a filter cartridge,
an unclogging unit provided for injecting an unclogging air flow into the filter cartridge during an unclogging operation,
a control unit which controls the fan and the unclogging unit as a function of pressure and load measurements in the air suction circuit, and
an upstream filtration unit which is arranged upstream of the settling chamber, said upstream filtration unit comprising a removable drawer whose bottom is provided with a filtering grid intended to retain the reusable particles of the absorbent medium used in the dry degreasing and deburring machine, so as to allow a user to recover the reusable particles of the absorbent medium by means of the drawer and then to discharge them into a treatment tank.

According to other features of the invention:
the removable drawer comprises an external front provided with a handle for gripping and a perforated bottom wall covered by the filtering grid;
the perforated bottom wall comprises, on the side of the external front, a flat portion and an inclined end portion, on the side opposite the external front;
the settling chamber comprises a membrane which is attached to the outer wall of the settling chamber in such a way as to be able to resiliently deform outward during an unclogging operation by damping the pressure wave generated by the flow of injected air and in such a way as to keep dust from returning into the removable drawer;
the membrane is in the form of a cylindrical sleeve which is radially clamped to the outer wall of the settling chamber at each of its axial ends;
the outer wall of the settling chamber has a number of openings which are arranged radially opposite the membrane;
the unclogging unit comprises an air injection nozzle which is arranged inside the settling chamber and which comprises a main body provided with at least one injection orifice, the at least one injection orifice opens into an intermediate chamber which communicates with the outside of the nozzle via a peripheral annular gap whose passage cross-section is smaller than the passage cross-section of the at least one injection orifice or the sum of the passage cross-sections of the injection orifices, so as to cause the air flow to accelerate at the outlet of the peripheral annular gap;
the air injection nozzle comprises a convexly curved wall which is arranged at the free end of the main body and the convex surface of which is arranged opposite the at least one injection orifice, the peripheral annular gap being delimited on one side by the main body and on the other by a part of the convexly curved wall;
the main body ends in a flaring fashion, forming a conical flange whose outside diameter is smaller than the outside diameter of the convexly curved wall, the peripheral annular gap being delimited, on the side of the main body, by the free end edge of the conical flange.

The invention also provides a dry degreasing and deburring machine comprising:
a rotating treatment tank designed to receive at least one workpiece, an absorbent medium and an abrasive medium, the tank being provided with orifices allowing the evacuation of dust and debris from the treatment outside the tank,
a suction channel to remove dust and debris, the treatment tank and the suction channel being arranged in a treatment chamber, and
a dust suction system according to one of the preceding characteristics, said suction system being connected to the suction channel.

According to an advantageous feature, the suction fan is connected to an air inlet of the treatment chamber, which makes it possible to reinject the air sucked by the suction channel into the treatment chamber, after filtration in the settling chamber.

The invention also provides a dust suction method for a dry degreasing and deburring machine that uses an absorbent medium and an abrasive medium in the degreasing and deburring process, the suction method comprising the following steps:

generating a suction flow in an air suction circuit so as to draw in the air contained in the treatment area of the machine, directing the sucked air to a settling chamber equipped with a filter cartridge, filtering the air before it enters the settling chamber in order to recover a reusable part of the absorbent medium, filtering the air sucked into the settling chamber by means of the filter cartridge so as to recover dust and waste suspended in the sucked air, adjusting the suction flow power according to the pressure measurements inside the air suction circuit, determining the need for unclogging according to the pressure measurements inside the air suction circuit, triggering an unclogging operation when a need for unclogging is identified, and during the step of filtering the air drawn in before it enters the settling chamber, the reusable particles of the absorbent medium are retained in a removable drawer whose bottom is provided with a filtering grid, so as to allow a user to recover the reusable particles of the absorbent medium by means of the drawer and then to discharge them into a treatment tank.

BRIEF DESCRIPTION OF THE FIGURES

Further features and advantages of the invention will become apparent from the following detailed description, which may be understood with reference to the attached drawings in which.

DETAILED DESCRIPTION OF THE INVENTION

In the following description, identical, similar or analogous elements will be referred to by the same reference numbers.

Figure 1:
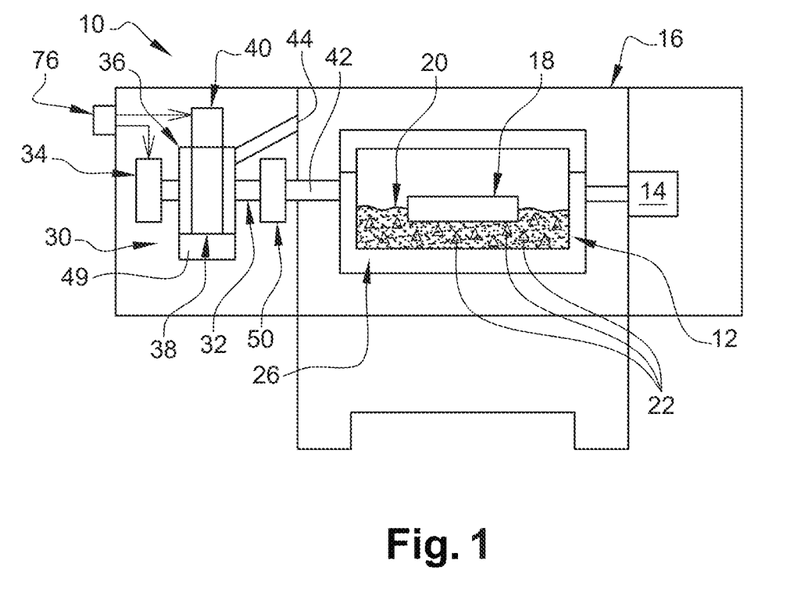
FIG. 1 is a schematic view showing a dry degreasing and deburring machine equipped with a dust suction system according to the invention.

In FIG. 1, a dry degreasing and deburring machine 10 is schematically shown comprising a rotating treatment tank 12 rotated by means of a gear motor 14 and arranged inside a treatment chamber 16, or treatment zone. The treatment tank 12 is designed to receive at least one workpiece 18, an absorbent medium 20, and an abrasive medium 22. The abrasive medium 22 is shown here in the form of triangles.

The absorbent medium 20 can be made of corn cob or wood chips. The abrasive medium 22 is preferably made of pieces, for example conical, of extruded polymer, preferably the extruded polymer SPIC marketed by Spaleck Industries, 1070 Allee Henri Hugoniot, 25600 Brognard, France.

Figure 2:
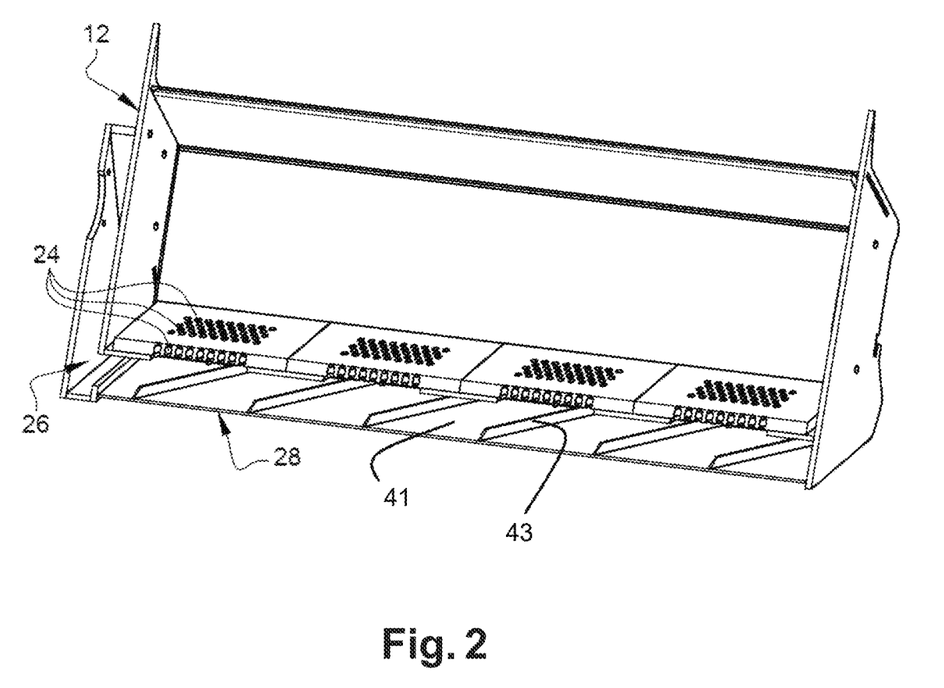
FIG. 2 is a perspective and cross-sectional view of the treatment tank and suction channel of the machine in FIG. 1.

As can be seen in FIG. 2, the treatment tank 12 is provided with discharge ports 24 which communicate with a lateral suction channel 26 allowing the removal of dust and debris from the treatment tank 12. The suction channel 26 comprises a wall 28 partially enclosing the tank 12 and is connected with a dust suction system 30 which is arranged here outside the treatment chamber 16.

Figure 3:
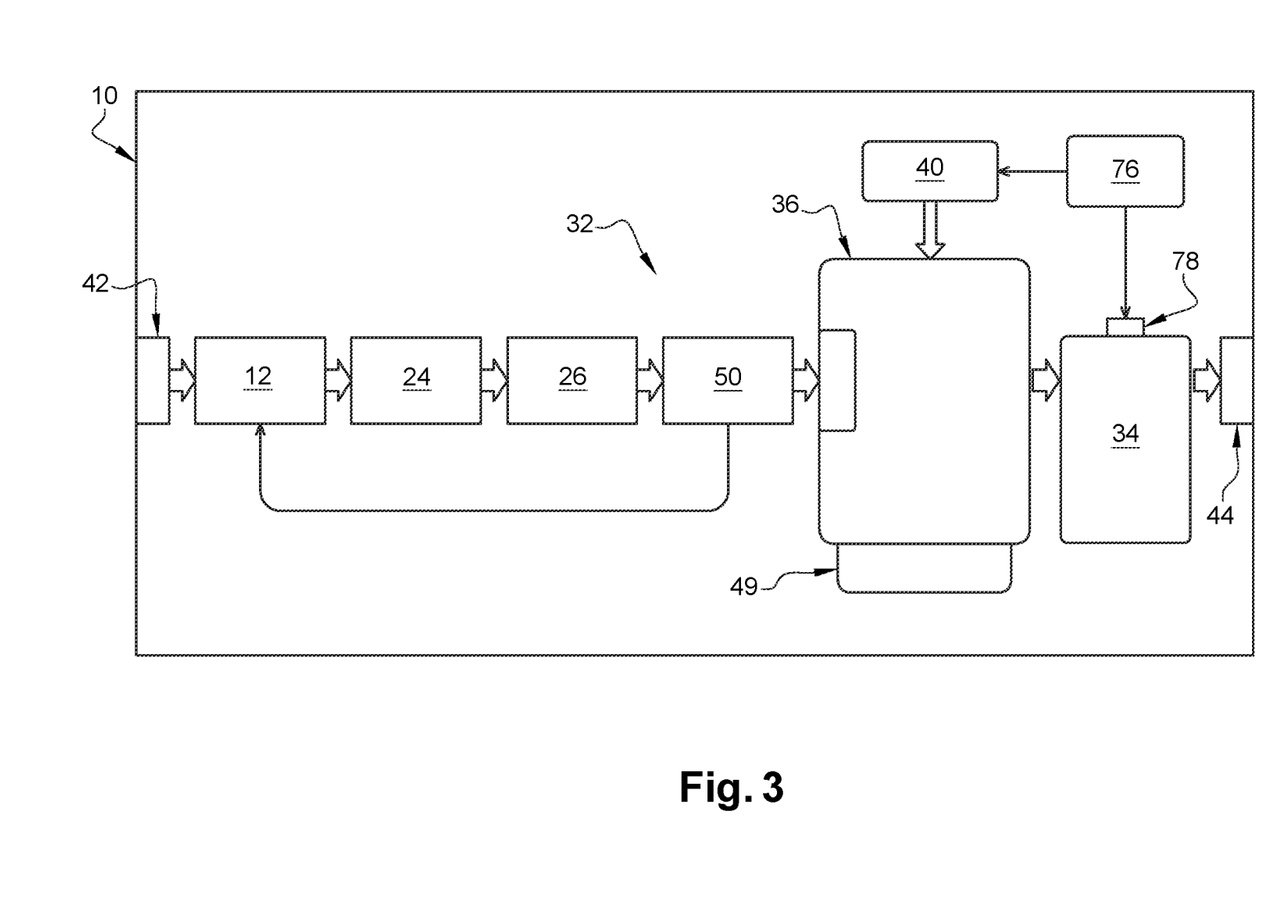
FIG. 3 is a block diagram that represents the machine of FIG. 1 and shows the air suction circuit of the machine.
Figure 4:
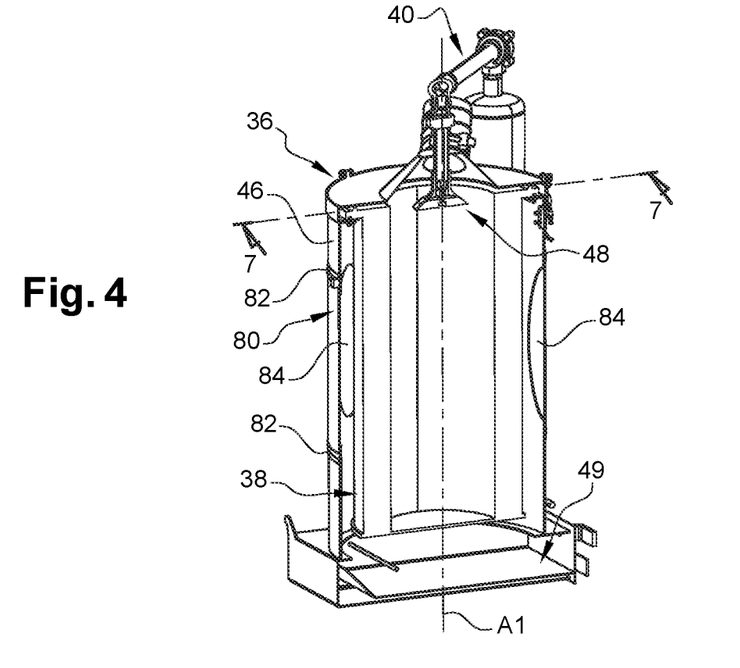
FIG. 4 is a perspective and cross-sectional view of the settling chamber equipping the dust suction system of FIG. 1.

The suction system 30 is now described in more detail with particular reference to FIGS. 1, 3 and 4. The suction system 30 comprises:

an air suction circuit 32
a suction fan 34,
a settling chamber 36 equipped with a filter cartridge 38, and
an unclogging unit 40 provided for injecting an unclogging air flow into the filter cartridge 38 during an unclogging operation.

Advantageously, the suction channel 26 has on its inner wall 41, opposite the discharge ports 24, inclined blades 43, or ribs, so that when the inner wall 41 is rotating with the treatment tank 12, an auger effect is produced driving the dust particles passed through the discharge ports 24 towards an axial end of the treatment tank 12. It is noted that this auger effect drives the dust particles toward the vacuum system 30 in the standard direction of rotation of the treatment tank 12, and it tends to drive the dust particles back toward the gear motor 14 in the reverse direction of rotation of the treatment tank 12.

According to the embodiment shown, air drawn through the air suction channel 26 enters the suction system 30 through an inlet port 42 that is connected to the intake channel 26. Preferably, after treatment by the suction system 30, the treated air is returned to the treatment chamber 16 via an outlet 44. This allows an optimal recycling of the air sucked in after treatment.

The settling chamber 36 here has a cylindrical outer wall 46 of circular cross-section. The filter cartridge 38 also has a cylindrical shape concentric with the outer wall 46.

According to alternative embodiments, the shape of the outer wall 46 and the filter cartridge 38 could be of a different shape, such as oval or other cross-section.

In the following description, a vertical axial orientation along the main axis A1 of the settling chamber 36 will be used as a non-limiting guide.

The unclogging unit 40 is here arranged at the upper axial end of the settling chamber 36. It includes an air injection nozzle 48 that extends axially within the filter cartridge 38 at its upper axial end. The settling chamber 36 also has a settling tank 49 at its lower axial end to collect dust by gravity for removal from the system.

The dust sucked in by the suction system 30, due to its composition and size, has a strong capacity to clog the filtering orifices of the filter cartridge 38. The unclogging unit 40 is therefore designed to inject a flow of compressed air in counter-current to the air suction circuit 32 in order to remove the dust that comes to cover the external walls of the filter cartridge 38 and to make it fall towards the settling tank 49. Advantageously, a non-return valve 51 is provided in the air inlet duct of the settling chamber 36 in order to prevent the compressed air flow from flowing back upstream in the air suction circuit 32 during an unclogging operation.

Figure 5:
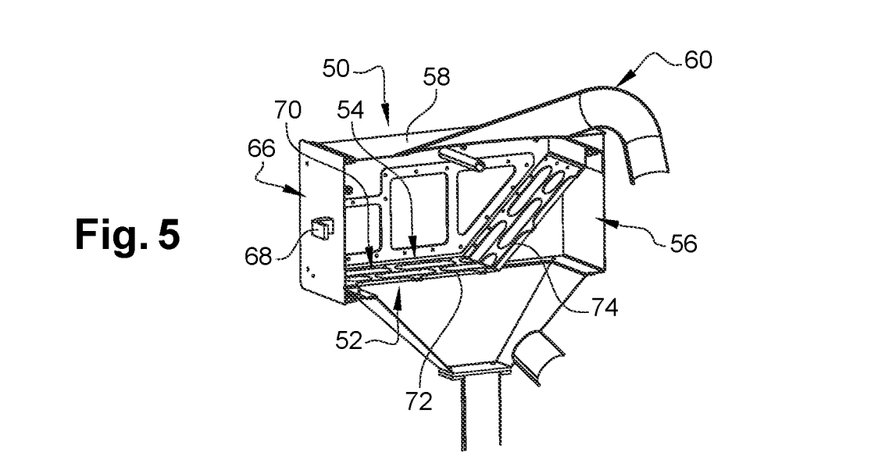
FIG. 5 is a perspective and cross-sectional view of the upstream filtration unit equipping the dust suction system of FIG. 1.
Figure 6:
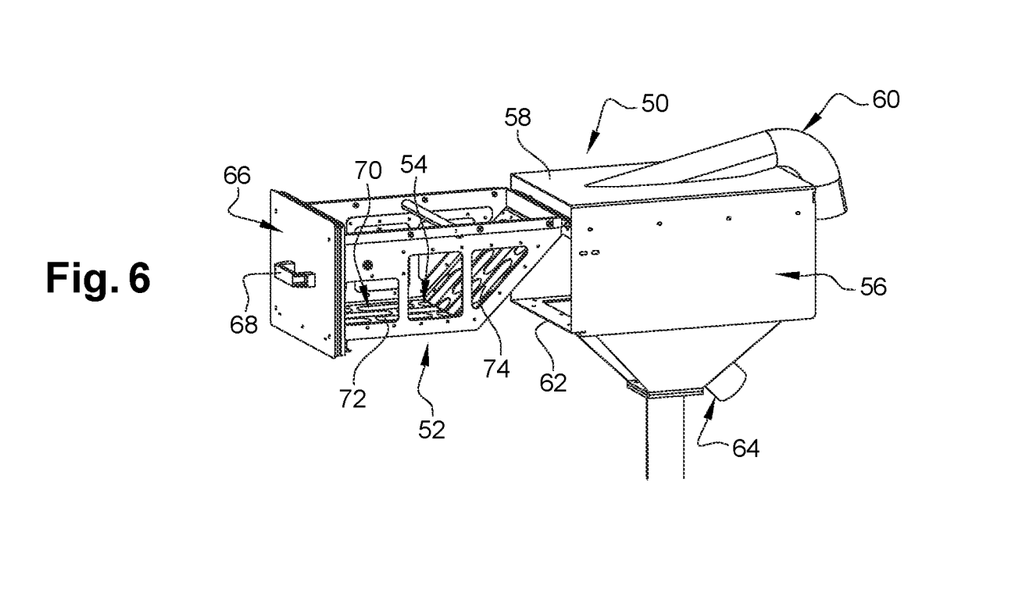
FIG. 6 is a perspective view showing the upstream filtration unit of FIG. 5 with the absorbent medium particle collection drawer removed.

According to the embodiment shown more particularly in FIGS. 5 and 6, the suction system 30 comprises an upstream filtration unit 50, or absorbent medium regeneration filter, which is arranged upstream of the settling chamber 36 and downstream of the inlet port 42. This upstream filtration unit 50 is designed to filter reusable particles from the absorbent medium 20 for reintroduction into the treatment tank 12. For this purpose, the upstream filtration unit 50 comprises a removable drawer 52, the bottom of which is provided with a filtering grid 54 designed to retain particles of absorbent medium having a sufficient diameter.

According to the shown embodiment, the upstream filtration unit 50 comprises a substantially parallelepipedic housing 56 which is connected by its upper wall 58 to an upstream conduit 60 and by its lower wall 62 to a downstream conduit 64.

Preferably, the removable drawer 52 comprises an external front 66 provided with a handle 68 for gripping and a perforated bottom wall 70 covered by the filtering grid 54. The filtering grid 54 has meshes sized to retain reusable absorbent particles 20, with the remaining absorbent particles 20 passing through the meshes of the filtering grid 54 and through the perforated bottom wall 70. The perforated bottom wall 70 here comprises, on the side of the external front 66, a planar portion 72 substantially parallel to the bottom wall 62 of the housing 56 and an inclined end portion 74, on the side opposite the external front 66.

As shown in FIGS. 5 and 6, the removable drawer 52 is slidably guided in the housing 56, allowing for easy handling.

Advantageously, a control unit 76 controls the suction fan 34 and the unclogging unit 40 as a function of pressure and load measurements in the air suction circuit 32. The pressure measurements are preferably taken just before the suction fan 34, in the settling chamber 36. According to one embodiment, the pressure measurements are taken in the upstream filter unit 50. These pressure measurements could also be taken at other locations in the air suction circuit 32.

Advantageously, the suction fan 34 is controlled by an electronic variable speed drive 78, which makes it possible to determine the load of the suction fan 34 from the intensity of the control current and from the load curve of the suction fan 34.

The control unit 76 can thus optimize the operation of the entire air suction circuit 32 by determining the optimal need for unclogging, for example when a drop in load exceeding a predetermined threshold is detected.

The pressure and load measurements also allow a better diagnosis of the machine 10 by detecting malfunctions or the need to refill the treatment tank 12 with absorbent media 20 and/or abrasive media 22 at a very early stage.

Figure 7:
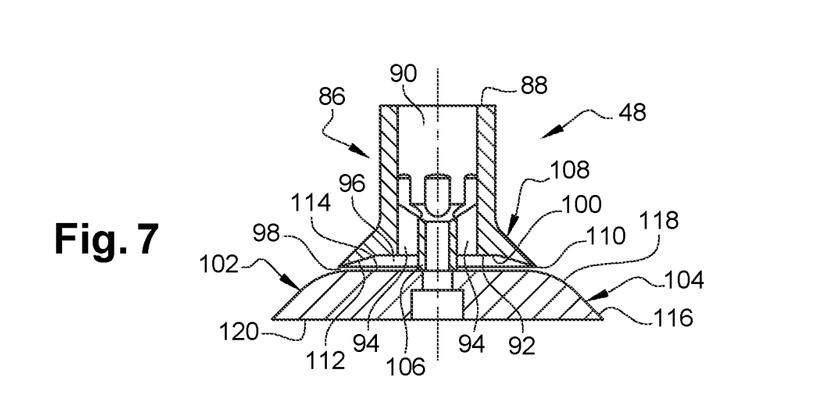
FIG. 7 is an axial cross-section 7-7 which represents the compressed air injection nozzle equipping the settling chamber of FIG. 4.
Figure 8:
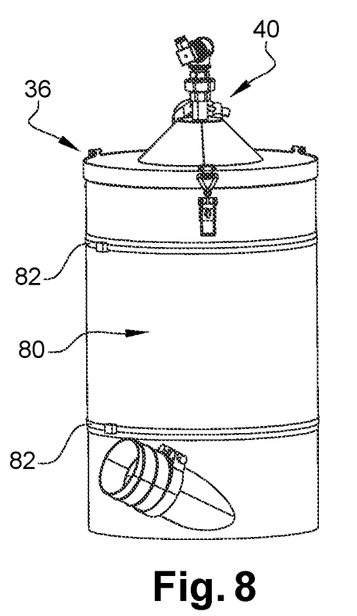
FIG. 8 is a perspective view of the settling chamber of FIG. 4 when the membrane is at rest.

According to an advantageous embodiment, which is shown more particularly in FIGS. 4, 7, and 8, the settling chamber 36 comprises a membrane 80, or decompression membrane, which is attached to the outer wall 46 of the settling chamber 36. This membrane 80 is designed to resiliently deform outward during an unclogging operation by damping the pressure wave generated by the flow of compressed air injected in the unclogging operation.

The membrane 80 is in the form of a cylindrical sleeve which is radially clamped to the outer wall 46 of the settling chamber 36 at each of its axial ends, for example by means of clamps 82. The membrane 80 is for example made of an elastomeric material so that it can be resiliently deformed during an unclogging operation. It is understood that the shape of the membrane 80 is adapted to be mounted on the outer wall 46.

Advantageously, the outer wall 46 of the settling chamber 36 has several openings 84, here oval in shape, which are arranged radially opposite the membrane 80. The openings 84 are here evenly spaced circumferentially so as to allow a good distribution of the pressure wave over the entire circumference of the membrane 80. The dimensions of each opening 84 are designed not to deteriorate the rigidity of the outer wall 46. In the example shown there are for example six openings 84.

The air injection nozzle 48 is now described in more detail, particularly with reference to FIGS. 4 and 7. The air injection nozzle 48 here comprises a main body 86 of generally cylindrical shape of circular cross-section which is connected by its upper axial end 88 to a compressed air supply. The main body 86 of the air injection nozzle 48 defines a compressed air supply channel 90. At its lower axial end 92, the main body 86 of the air injection nozzle 48 here comprises a plurality of injection ports 94 which open upstream into the supply channel 90 and downstream into an intermediate chamber 96. Advantageously, the intermediate chamber 96 communicates with the outside of the air injection nozzle 48 through a peripheral annular gap 98 whose passage cross-section is smaller than the sum of the passage cross-sections of the injection orifices 94, so as to cause an acceleration of the air flow at the outlet of the peripheral annular gap 98.

According to the shown embodiment, the air injection nozzle 48 comprises 6 injection ports 94. According to alternative embodiments, there could be a single injection port 94 or a different number of injection ports 94.

According to the shown embodiment, the intermediate chamber 96 is bounded, in its upper portion, by a radial end wall 100 of the main body 86 and, in its lower portion, by a convexly curved wall 102. The convexly curved wall 102 is here formed by the top wall of a disk 104 which is for example fixed to a central stud 106 of the main body 86, for example by screwing.

Advantageously, the main body 86 flares out at its lower axial end, forming a conical flange 108 whose outside diameter is smaller than the outside diameter of the convexly curved wall 102. Here, the injection ports 94 open into the radial end wall 100 between the outer diameter of the conical flange 108 and the center stud 106. Thus, the peripheral annular gap 98 is delimited, on the side of the main body 86, by the free end edge 110 of the conical flange 108.

Preferably, the passage cross-section in the peripheral annular gap 98 is less than the passage cross-section in all of the injection ports 94, for example between 40 and 60% of the passage cross-section of the injection ports 94, preferably 50%.

According to the embodiment shown, the conical flange 108 has a conical inner wall 112 that is adjacent to the radial end wall 100 of the main body 86 and defines a portion of the intermediate chamber 96.

According to the shown embodiment, the surface of the convexly curved wall 102 comprises:
- a flat central portion 114, the outside diameter of which is substantially equal to the outside diameter of the conical flange 108,
- a peripheral annular conical portion 116, and
- a convexly curved intermediate annular portion 118, which is arcuate in cross-section, said intermediate annular portion 118 being adjacent on one side to the central portion 114 and on the other side to the peripheral annular portion 116.

Preferably, the underside 120 of the disk 104 is planar so as to form an acute angle with the conical peripheral annular portion 116.

During an unclogging operation, compressed air is supplied through the supply channel 90 and accelerated through the injection ports 94. The compressed air flow enters the intermediate chamber 96 and then accelerates again through the peripheral annular gap 98. Due to the Coanda effect, the compressed air flow tends to follow the curvature of the convex curved wall 102 and, due to the Venturi effect, causes an air suction effect near the free end of the convex curved wall 102. The Venturi effect causes the air located in the vicinity of the main body 86 to be drawn in above the peripheral annular portion 116 of the convexly curved wall 102. The Coanda effect combined with the Venturi effect produces a cone of compressed air directed downwards inside the filter cartridge 38. This air flow is particularly powerful and effective and is optimally distributed over the entire circumference of the inner wall of the filter cartridge 38, producing a particularly effective unclogging effect. The particular shape of the air injection nozzle 48 thus allows a good distribution of the unclogging air flow in the filter cartridge 38.

The operation of the machine 10 and the suction system 30 described above is now described.

The treatment chamber 16 is open and the workpiece(s) 18 are positioned in the treatment tank 12 with the absorbent medium 20 and with the abrasive medium 18. The treatment tank 12 is rotated by means of the gear motor 14 and the suction system 30 is switched on via the control unit 76.

Rotating the treatment tank 12 causes the deburring of the workpiece 18, which produces dust and media residue that is drawn through the ports 24 by the suction channel 26.

This dust is drawn into the intake air stream and enters the upstream filter unit 50 where particles of absorbent medium 20 of sufficient size to be reused are deposited on the filtering grid 54.

The dust drawn into the suction air stream then enters the settling chamber 36 where it is retained on the outer walls of the filter cartridge 38 and settles by gravity in the settling tank 49.

The filtered air is then passed through the fan 34 before being reintroduced into the treatment chamber 16 through the outlet 44.

The control unit 76 makes regular measurements of the load on the fan 34 and the pressure in the air circuit 32. When the load and pressure conditions indicate a need for unclogging, the control unit 76 initiates an unclogging operation. To do this, it commands the unclogging unit 40 to produce a discharge of compressed air through the air injection nozzle 48. This discharge of compressed air produces a cone of pressurized air at the outlet of the air injection nozzle 48, which causes the dust clusters present on the outer wall of the filter cartridge 38 to loosen.

Figure 9:
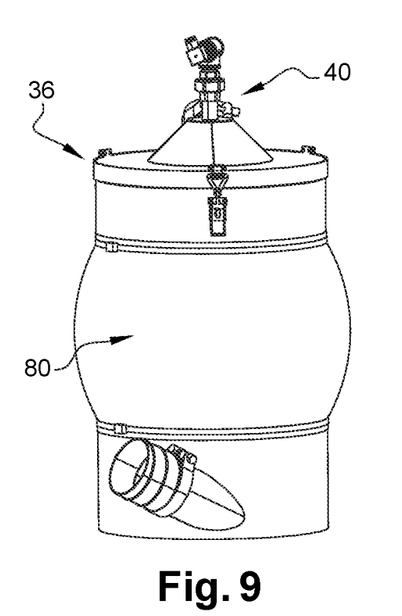
FIG. 9 is a perspective view similar to FIG. 8 which shows the settling chamber of FIG. 4 during an unclogging operation, with the membrane being deformed by the pressure wave produced by the unclogging air flow.

The discharge of compressed air also produces a pressure wave within the settling chamber 36. This pressure wave is elastically absorbed by the diaphragm 80 as it deforms from its rest position, shown in FIGS. 4 and 8, to a deformed, or inflated, position shown in FIG. 9. Thus, the membrane 80 allows the pressure wave to be damped, which improves the efficiency of the unclogging operation.

A dust suction method for the dry degreasing and deburring machine 10 comprises the following steps:
- generating a suction flow in the air suction circuit 32 so as to draw in the air contained in the treatment area of the machine 10,
- directing the sucked air to a settling chamber 36 equipped with a filter cartridge 38,
- filtering the air before it enters the settling chamber 36 in order to recover a reusable part of the absorbent medium 20,
- filtering the air sucked into the settling chamber 36 by means of the filter cartridge 38 so as to recover dust and waste suspended in the sucked air,
- adjusting the suction flow power according to the pressure measurements inside the air suction circuit 32,
- determining the need for unclogging according to the pressure measurements inside the air suction circuit 32,
- triggering an unclogging operation when a need for unclogging is identified.

The invention claimed is:

1. A dry degreasing and deburring machine comprising:
   a rotating treatment tank designed to receive at least one workpiece, an absorbent medium and an abrasive medium, the treatment tank being provided with orifices allowing the evacuation of dust and debris from a treatment out from the treatment tank,
   a suction channel to remove dust and debris,
   the treatment tank and the suction channel being arranged in a treatment chamber,
   wherein the dry degreasing and deburring machine comprises a suction system being connected to the suction channel, said suction system comprising:
   an air suction circuit,
   a suction fan,
   a settling chamber equipped with a filter cartridge,
   an unclogging unit provided for injecting an unclogging air flow into the filter cartridge during an unclogging operation,
   a control unit which controls the fan and the unclogging unit as a function of pressure and load measurements in the air suction circuit,
   wherein an upstream filtration unit is arranged upstream of the settling chamber, said upstream filtration unit comprising a removable drawer whose bottom is provided with a filtering grid intended to retain reusable particles of the absorbent medium, so as to allow a user to recover the reusable particles of the absorbent medium by means of the drawer and then to discharge them into the treatment tank.

2. The dry degreasing and deburring machine according to claim 1, wherein the suction fan is connected to the treatment chamber in order to reinject the air sucked in through the suction channel into the treatment chamber, after filtration in the settling chamber.

3. The dry degreasing and deburring machine according to claim 2, wherein the removable drawer comprises an external front provided with a handle for gripping and a perforated bottom wall covered by the filtering grid.

4. The dry degreasing and deburring machine according to claim 3, wherein the perforated bottom wall comprises, on the side of the external front, a flat portion and an inclined end portion, on the side opposite the external front.

5. The dry degreasing and deburring machine according to claim 2, wherein the settling chamber comprises a membrane which is attached to an outer wall of the settling chamber in such a way as to be able to resiliently deform outward during an unclogging operation, thus damping the pressure wave generated by the flow of unclogging air, and in such a way as to keep dust from returning into the removable drawer.

6. The dry degreasing and deburring machine according to claim 5, characterized in that the membrane is in the form of a cylindrical sleeve which is radially clamped onto the outer wall of the settling chamber at each of its axial ends.

7. The dry degreasing and deburring machine according to claim 5, wherein the outer wall of the settling chamber has a plurality of openings which are arranged radially opposite the membrane.

8. The dry degreasing and deburring machine according to claim 2, wherein the unclogging unit comprises an air injection nozzle which is arranged inside the settling chamber and inside the filter cartridge and which comprises a main body provided with at least one injection orifice, in that the at least one injection orifice opens into an intermediate chamber which communicates with the outside of the nozzle via a peripheral annular gap, the passage cross-section of which is smaller than the passage cross-section of the at least one injection orifice or the sum of the passage cross-sections of the injection orifices, so as to cause an acceleration of the air flow at the outlet of the peripheral annular gap.

9. The dry degreasing and deburring machine according to the preceding claim 8, wherein the nozzle comprises a convexly curved wall which is arranged at the free end of the main body and the convex surface of which is arranged opposite the injection orifice or orifices, the peripheral annular gap being delimited on one side by the main body and on the other by a part of the convexly curved wall.

10. The dry degreasing and deburring machine according to claim 9, wherein the main body ends in a flaring manner, thus forming a conical flange, the external diameter of which is smaller than the external diameter of the convexly curved wall, the peripheral annular gap being delimited, on the side of the main body, by the free end edge of the conical flange.

11. The dry degreasing and deburring machine according to claim 1, wherein the removable drawer comprises an external front provided with a handle for gripping and a perforated bottom wall covered by the filtering grid.

12. The dry degreasing and deburring machine according to claim 11, wherein the perforated bottom wall comprises, on the side of the external front, a flat portion and an inclined end portion, on the side opposite the external front.

13. The dry degreasing and deburring machine according to claim 1, wherein the settling chamber comprises a membrane which is attached to an outer wall of the settling chamber in such a way as to be able to resiliently deform outward during an unclogging operation, thus damping the pressure wave generated by the flow of unclogging air, and in such a way as to keep dust from returning into the removable drawer.

14. The dry degreasing and deburring machine according to claim 13, characterized in that the membrane is in the form of a cylindrical sleeve which is radially clamped onto the outer wall of the settling chamber at each of its axial ends.

15. The dry degreasing and deburring machine according to claim 13, wherein the outer wall of the settling chamber has a plurality of openings which are arranged radially opposite the membrane.

16. The dry degreasing and deburring machine according to claim 1, wherein the unclogging unit comprises an air injection nozzle which is arranged inside the settling chamber and inside the filter cartridge and which comprises a main body provided with at least one injection orifice, in that the at least one injection orifice opens into an intermediate chamber which communicates with the outside of the nozzle via a peripheral annular gap, the passage cross-section of which is smaller than the passage cross-section of the at least one injection orifice or the sum of the passage cross-sections of the injection orifices, so as to cause an acceleration of the air flow at the outlet of the peripheral annular gap.

17. The dry degreasing and deburring machine according to the preceding claim 16, wherein the nozzle comprises a convexly curved wall which is arranged at the free end of the main body and the convex surface of which is arranged opposite the injection orifice or orifices, the peripheral annular gap being delimited on one side by the main body and on the other by a part of the convexly curved wall.

18. The dry degreasing and deburring machine according to claim 17, wherein the main body ends in a flaring manner, thus forming a conical flange, the external diameter of which is smaller than the external diameter of the convexly curved wall, the peripheral annular gap being delimited, on the side of the main body, by the free end edge of the conical flange.

\* \* \* \* \*